(12) United States Patent
Diggins et al.

(10) Patent No.: US 9,525,869 B2
(45) Date of Patent: Dec. 20, 2016

(54) ENCODING AN IMAGE

(71) Applicant: Imagination Technologies Limited, Kings Langley (GB)

(72) Inventors: Jonathan Diggins, Chesham (GB); Paul Brasnett, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 112 days.

(21) Appl. No.: 14/263,373

(22) Filed: Apr. 28, 2014

(65) Prior Publication Data

US 2014/0369621 A1    Dec. 18, 2014

(30) Foreign Application Priority Data

May 3, 2013   (GB) .................................. 1308073.4
Sep. 23, 2013  (GB) .................................. 1316816.6
Apr. 3, 2014   (GB) .................................. 1406016.4

(51) Int. Cl.
*G06K 9/00*   (2006.01)
*H04N 19/124*  (2014.01)
(Continued)

(52) U.S. Cl.
CPC ........ *H04N 19/0009* (2013.01); *H04N 19/124* (2014.11); *H04N 19/14* (2014.11);
(Continued)

(58) Field of Classification Search
CPC ...... H04N 19/85; H04N 19/124; H04N 19/14; H04N 19/0009; H04N 19/00303; H04N 19/00569; H04N 19/00951; H04N 19/107; H04N 19/159; H04N 19/149; H04N 19/176; H04N 19/182; H04N 19/40; H04N 19/50; H04N 19/8042; H04N 19/46; H04N 19/91; H04N 19/8205
(Continued)

(56) References Cited

U.S. PATENT DOCUMENTS 5,638,125 A       6/1997 Jeong et al.
2008/0159387 A1   7/2008 Dvir et al.
(Continued)

FOREIGN PATENT DOCUMENTS

EP    0743793 A2     11/1996
WO    0046999 A1     8/2000
WO    2014080597 A1  5/2014

OTHER PUBLICATIONS

GB Application No. GB1316816.6 Search Report dated Nov. 20, 2013.
(Continued)

*Primary Examiner* — Ali Bayat
(74) *Attorney, Agent, or Firm* — Vorys, Sater, Seymour and Pease LLP; Vincent M DeLuca

(57) ABSTRACT

An image processor comprises an image pre-processing block and an encoder processing block for processing and encoding an image. The image pre-processing block receives image data and processes it to provide an image comprising image sections which each comprise pixels. For each of the image sections, the pixels are analyzed to estimate an indication of the complexity of the image section, and metadata is determined based on the estimated complexity indications of the image sections. The metadata is passed to the encoder processing block which uses it to determine a quantization level for use in encoding the image. The encoder processing block can then encode the image using the determined quantization level. Conveniently, the image pre-processing block 106 processes the image data to
(Continued)

provide the image, and therefore has access to the image which it can analyze to determine the metadata without requiring a separate read operation of the image.

20 Claims, 8 Drawing Sheets

(51) Int. Cl.
   *H04N 19/176* (2014.01)
   *H04N 19/149* (2014.01)
   *H04N 19/14* (2014.01)
   *H04N 19/85* (2014.01)
   *H04N 19/88* (2014.01)
   *H04N 19/50* (2014.01)
   *H04N 19/91* (2014.01)
   *H04N 19/182* (2014.01)

(52) U.S. Cl.
   CPC ......... *H04N 19/149* (2014.11); *H04N 19/176* (2014.11); *H04N 19/182* (2014.11); *H04N 19/50* (2014.11); *H04N 19/85* (2014.11); *H04N 19/88* (2014.11); *H04N 19/91* (2014.11)

(58) Field of Classification Search
   USPC ........................................................ 382/251
   See application file for complete search history.

(56) References Cited

U.S. PATENT DOCUMENTS

| | | | |
|---|---|---|---|
| 2010/0290524 A1* | 11/2010 | Lu ........................ | H04N 19/176 375/240.03 |
| 2010/0309987 A1* | 12/2010 | Concion ................ | H04N 5/772 375/240.26 |
| 2013/0083855 A1* | 4/2013 | Kottke ................... | H04N 19/46 375/240.18 |
| 2014/0181266 A1* | 6/2014 | Joch ...................... | H04L 65/605 709/219 |

OTHER PUBLICATIONS

GB Application No. GB1316816.6 Search Report dated Nov. 5, 2013.
V-A. Nguyen "Efficient Video Transcoding from H.263 to H.264/AVC Standard with Enhanced Rate Control", Hindawi Publishing Corporation, EURASIP Journal on Applied Signal Processing, vol. 2006, Article ID 83563, pp. 1-15.
T-H Tsai, "A Rate Control Scheme for H.264 Video Transmission," 2004,Multimedia and Expo, IEEE Int. Conf. ICME '04, vol. 2, pp. 1359-1362.
GB Application No. GB1406016.4 Search Report dated Sep. 30, 2013.

* cited by examiner

ENCODING AN IMAGE

BACKGROUND

An image sensor, such as a camera, may be used to capture image data. Image data can be processed by an image processor to provide an image comprising a plurality of pixels. The initial image data representing the values of the pixels of an image may subsequently be encoded. An aim of encoding the image is often to reduce the amount of data that is used to represent the image. Therefore, the encoding of the image may involve some compression of the image. A lossless encoding algorithm may be used to encode the image without losing any of the information in the image. In contrast, a lossy encoding algorithm may be used to encode the image, and in doing so compress the image to a greater extent than it would be compressed using a lossless encoding algorithm. However, when a lossy encoding algorithm is used to encode an image, some of the information in the image may be lost.

There is often redundancy in the initial image data which represents the values of each of the pixels in the image, because there is often some correlation between pixel values in the image, e.g. for pixels which are located next to, or at least near to, each other in the image. For example, the colour of a group of pixels which all have the same colour can be compressed (losslessly) by storing the colour once along with some grouping information to represent the colour of all of the pixels of the group rather than by storing the colour multiple times, i.e. once for each of the pixels. The more redundancy there is in the image, the more the image can be compressed without losing any of the information in the image. A quantization parameter (QP) used by the encoder regulates how much detail is saved. When the QP used by the encoder is very small, almost all the detail in the image is retained. When the QP used by the encoder is increased, some of the detail in the image is aggregated so that the bit rate of the encoded image drops, but at the price of some increase in distortion and some loss of quality of the encoded image.

It may be beneficial for an encoder to provide an encoded image at a constant (or near constant) bitrate both across the image, and when the image is a frame within a video stream comprising multiple frames across the different frames of the video stream. A buffer may be used, and operated as a 'leaky bucket', which is emptied at a constant rate whilst being filled at a variable rate with encoded image data from the encoder. A rate controller may be used to adjust the QP used by the encoder in accordance with a target bitrate and such that the buffer is not depleted or saturated. The rate controller receives feedback from the encoder to indicate the number of bits that have been generated by encoding previous images and/or previous sections of an image currently being encoded. The rate controller may use the feedback to determine how the QP should be varied for encoding subsequent images and/or subsequent sections of an image currently being encoded.

The redundancy in an image may vary significantly from image to image as well as from one section of an image to another section of that same image. It may be that the image can be encoded only once (e.g. when the image is encoded in real-time), such that an image is not re-encoded if too few or too many bits are generated, relative to the target bitrate, by encoding the image. Furthermore, in order to reduce the storage requirements of the buffer and to keep the latency of the encoding of the image to an acceptably low level, the size of the buffer is constrained. Furthermore, larger variations in the QP used to encode different sections of the same image may result in a perceptually lower quality encoded image. Therefore, the rate controller might not allow the QP to vary by more than a threshold amount for the encoding of an image.

The constraints mentioned above can result in cases in which the rate controller does not optimally (or even nearly optimally) control the QP used by the encoder to encode the sections of an image (e.g. when the image is encoded in real-time). For example, the amount of detail in an image may be localised, e.g. the bottom quarter of the image may include more detail than the rest of the image. In this situation, the rate controller may be operating well within a bit budget for three quarters of the image, using up three quarters of the bit budget. However, when the encoder encodes the bottom quarter of the image containing a high level of detail, the rate controller is forced to increase the QP (compared to that which would be well suited for encoding the level of detail in the bottom quarter of the image) in order for the encoder to stay within the bit budget. Changing the QP in this way may result in a perceptually low quality encoded image.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of determining a quantization level for use by an encoder in encoding an image in accordance with a target number of bits, wherein the image comprises one or more image sections which each comprise a plurality of pixels, the method comprising: for each of the one or more image sections in the image, analysing the pixels in the image section to estimate an indication of the complexity of the image section; for each of a plurality of candidate quantization levels, using a relationship and the one or more estimated indications of the complexity of the one or more image sections to estimate an indication of the number of bits that would be generated by encoding the one or more image sections in the image with the encoder using the respective candidate quantization level, wherein said relationship is a function of the quantization level used by the encoder, and wherein said relationship is for use in relating: (i) an indication of the complexity of an image section, to (ii) an estimate of an indication of the number of bits that would be generated by encoding that image section with the encoder; and selecting one of the plurality of candidate quantization levels based on the target number of bits and based on the estimated indications of the number of bits that would be generated by encoding the one or more image sections in the image with the encoder using the respective candidate quantization levels, wherein said selected quantization level is for use by the encoder in encoding the image.

There is provided a processing block configured to determine a quantization level for use by an encoder in encoding an image in accordance with a target number of bits, wherein the image comprises one or more image sections which each comprise a plurality of pixels, wherein the processing block is configured to: for each of the one or more image sections in the image, analyse the pixels in the image section to estimate an indication of the complexity of the image section; for each of a plurality of candidate quantization levels, use a relationship and the one or more estimated indications of the complexity of the one or more image sections to estimate an indication of the number of bits that would be generated by encoding the one or more image sections in the image with the encoder using the respective candidate quantization level, wherein said relationship is a function of the quantization level used by the encoder, and wherein said relationship is for use in relating: (i) an indication of the complexity of an image section, to (ii) an estimate of an indication of the number of bits that would be generated by encoding that image section with the encoder; and select one of the plurality of candidate quantization levels based on the target number of bits and based on the estimated indications of the number of bits that would be generated by encoding the one or more image sections in the image with the encoder using the respective candidate quantization levels, wherein said selected quantization level is for use by the encoder in encoding the image.

There is provided a processing block configured to determine a quantization level for use by an encoder in encoding an image in accordance with a target number of bits, wherein the image comprises one or more image sections which each comprise a plurality of pixels, the processing block comprising: an image analysis module configured to analyse, for each of the one or more image sections in the image, the pixels in the image section to estimate an indication of the complexity of the image section; a bit estimation module configured to: for each of a plurality of candidate quantization levels, use a relationship and the one or more estimated indications of the complexity of the one or more image sections to estimate an indication of the number of bits that would be generated by encoding the one or more image sections in the image with the encoder using the respective candidate quantization level, wherein said relationship is a function of the quantization level used by the encoder, and wherein said relationship is for use in relating: (i) an indication of the complexity of an image section, to (ii) an estimate of an indication of the number of bits that would be generated by encoding that image section with the encoder; and a quantization level selection module configured to select one of the plurality of candidate quantization levels based on the target number of bits and based on the estimated indications of the number of bits that would be generated by encoding the one or more image sections in the image with the encoder using the respective candidate quantization levels, wherein said selected quantization level is for use by the encoder in encoding the image.

There is provided a computer program product configured to determine a quantization level for use by an encoder in encoding an image in accordance with a target number of bits, the computer program product being embodied on a computer-readable storage medium and configured so as when executed on a processor to perform any of the methods described herein. There may also be provided a computer readable storage medium having encoded thereon computer readable program code for generating a processing block configured to perform any of the methods described herein.

There is provided an image processor comprising an image pre-processing block and an encoder processing block, wherein the image pre-processing block is configured to: receive image data; process the received image data to provide an image comprising one or more image sections which each comprise a plurality of pixels; for each of the one or more image sections in the image, analyse the pixels in the image section to estimate an indication of the complexity of the image section; determine metadata based on the one or more estimated indications of the complexity of the one or more image sections; and output the determined metadata, and wherein the encoder processing block is configured to: receive the metadata determined by the image pre-processing block; use the received metadata to determine a quantization level for use in encoding the image; and encode the image using the determined quantization level.

There is provided a method of processing an image using an image processor comprising an image pre-processing block and an encoder processing block, wherein the method comprises: receiving image data at the image pre-processing block; processing the received image data at the image pre-processing block to provide an image comprising one or more image sections which each comprise a plurality of pixels; for each of the one or more image sections in the image, the image pre-processing block analysing the pixels in the image section to estimate an indication of the complexity of the image section; the image pre-processing block determining metadata based on the one or more estimated indications of the complexity of the one or more image sections; using the metadata at the encoder processing block to determine a quantization level for use in encoding the image; and encoding the image at the encoder processing block using the determined quantization level.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

DETAILED DESCRIPTION

Embodiments will now be described by way of example only. Initially we describe examples involving images which are to be encoded according to Intra encoding in which an image is encoded without reference to other images (e.g. other frames of a video sequence). As described later, similar principles apply to images which are encoded according to inter (or "non-intra") encoding in which an image is encoded with reference to other images (e.g. other frames of a video sequence).

In examples described herein, an image is analysed in order to determine an indication of the complexity of the image (e.g. an entropy of the image). The image analysis described herein is a simple process performed before the image is encoded. The indication of the complexity of the image is used to estimate the number of bits that would be generated by an encoder encoding the image at each one of a plurality of different quantization levels. One of the quantization levels is selected based on the estimates and based on a target number of bits for the encoded image. In this way, the quantization level used to encode a particular image is estimated based on the complexity of that same particular image. The quantization level is selected before the image is encoded. In this way, the image does not need to be encoded once before determining an estimate of a suitable quantization level for encoding the image. An indication of the selected quantization level is sent to a rate controller which can control the quantization level used by the encoder to encode the image. The rate controller may vary the quantization level used by the encoder based on information that is available to the rate controller, e.g. based on feedback from the encoder. However, the selected quantization level is well suited for use by the encoder in encoding the image because the selected quantization level is determined based on the complexity of the particular image (e.g. based on the complexity of different image sections within the image). Furthermore, the selection of the quantization level may depend upon the type of the encoder that is to be used to encode the image. For example, the encoder may be a High Efficiency Video Coding (HEVC) encoder which is configured to encode an image according to the HEVC compression standard. A quantization level selected for use by an HEVC encoder may be different to a quantization level selected for use by an encoder which encodes images according to some other compression standard (e.g. according to the H.264 compression standard).

Figure 1:
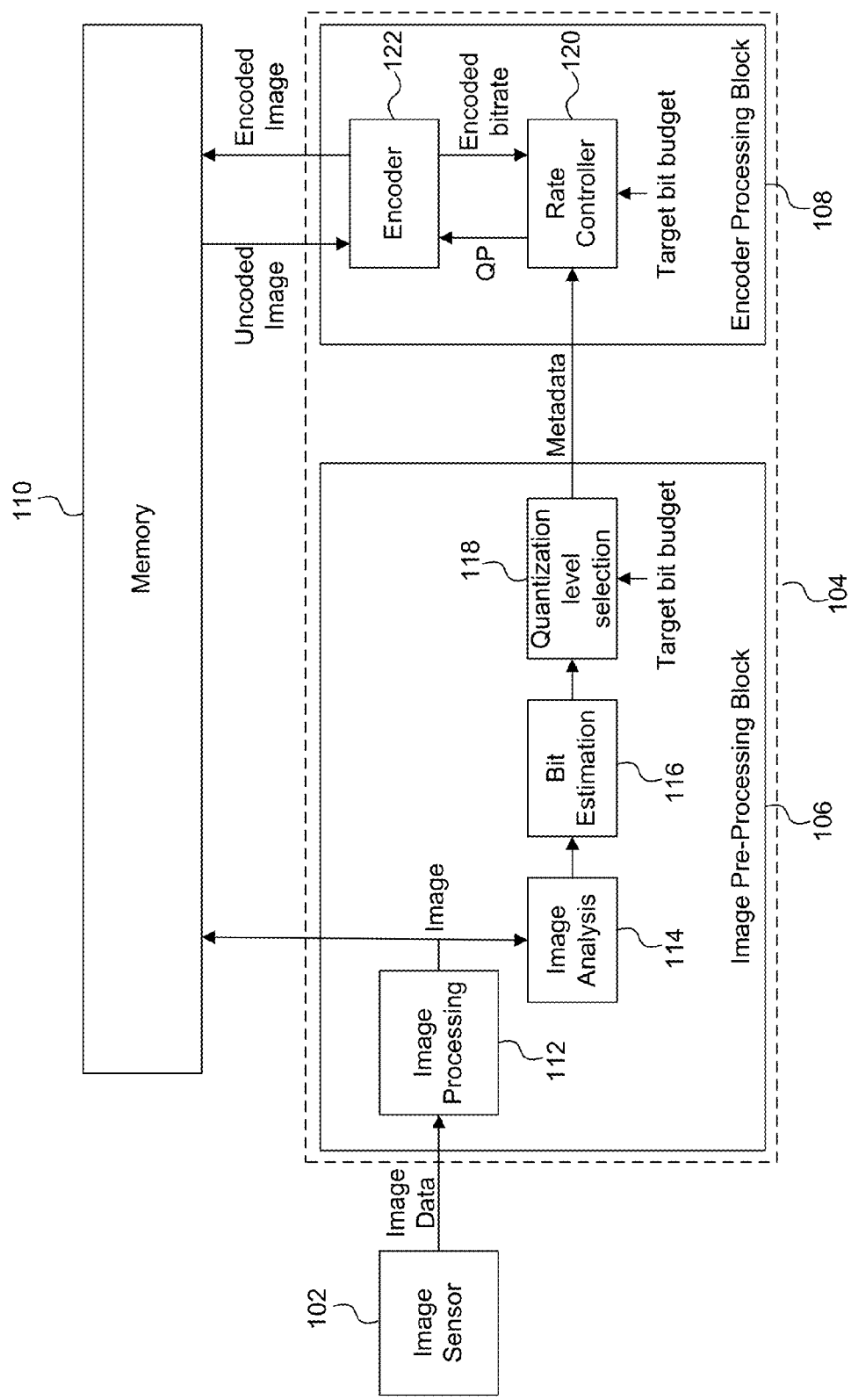
FIG. 1 shows an image processing system.

FIG. 1 shows an image processing system comprising an image sensor 102 and an image processor 104 which comprises an image pre-processing block 106 and an encoder processing block 108. The image processing system also comprises a memory 110. The image pre-processing block 106 comprises an image processing module 112, an image analysis module 114, a bit estimation module 116 and a quantization level selection module 118. The encoder processing block 108 comprises a rate controller 120 and an encoder module 122. An output of the image sensor 102 is coupled to an input of the image processing module 112. An output of the image processing module 112 is coupled to the memory 110 and to an input of the image analysis module 114. An output of the image analysis module 114 is coupled to an input of the bit estimation module 116. An output of the bit estimation module 116 is coupled to an input of the quantization level selection module 118. The quantization level selection module 118 is configured to receive an indication of a target bit budget. An output of the quantization level selection module 118 is coupled to a first input of the rate controller 120. The rate controller 120 is configured to receive an indication of the target bit budget. An output of the rate controller 120 is coupled to an input of the encoder module 122. A first output of the encoder module 122 is coupled to a second input of the rate controller 120. The encoder module 122 is configured to receive an (uncoded) image from the memory 110 and to output an encoded image to the memory 110. In an example, the "encoding" performed by the encoder module 122 is digital image compression. All of the elements of the image processing system shown in FIG. 1 may be implemented within the same device, e.g. a camera, mobile phone, tablet, laptop or any other device which may receive and process image data. Alternatively, one or more of the elements of the image processing system shown in FIG. 1 may be implemented in a separate device to other elements of the image processing system shown in FIG. 1. For example, the image sensor 102 may be implemented on a separate device to the image processor 104 and the memory 110, wherein the image sensor 102 may be connected to the image processor 104 via a suitable interface, e.g. over a wired or wireless connection, e.g. a USB connection, a Wi-Fi connection, a Bluetooth connection, or a connection over the internet to give just some examples.

Figure 2:
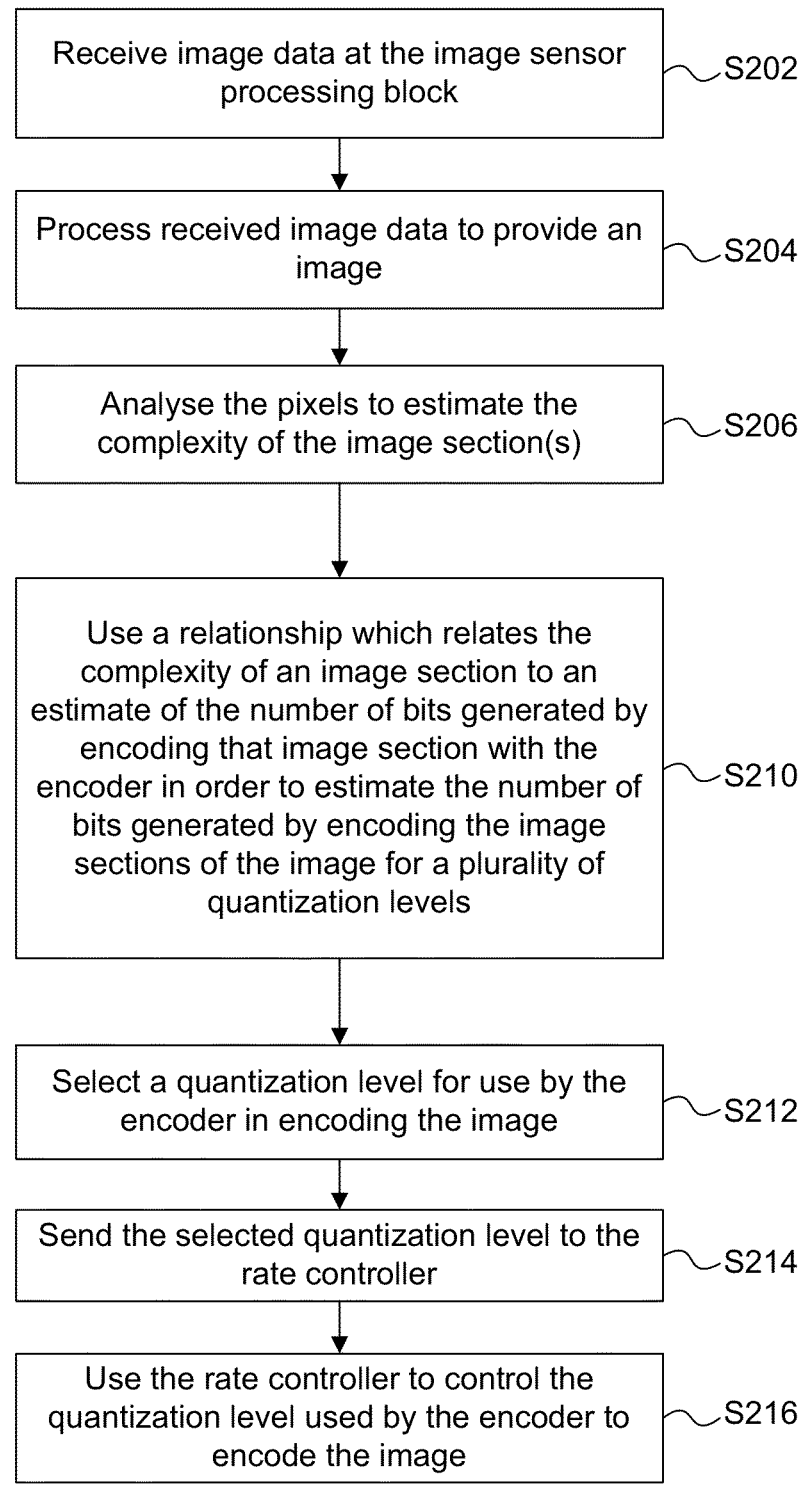
FIG. 2 shows a flowchart for a process of encoding an image.

The operation of the image processing system shown in FIG. 1 is described with reference to the flowchart shown in FIG. 2 for a method of encoding an image according to intra encoding. The image sensor 102 senses an image. Details of how an image sensor may sense an image are known to those skilled in the art, and as such as not provided herein. In step S202 image data is received at the image pre-processing block 106 from the image sensor 102. In particular, the image processing module 112 receives the image data. The image processing module 112 is configured to process image data to provide an image comprising a plurality of pixels.

In step S204 the image processing module 112 processes the image data received in step S202 to provide an image comprising a plurality of pixels. Details of the processing which is performed by the image processing module 112 are beyond the scope of this description and would be known to a person skilled in the art. However, for example, the image processing module 112 may perform known processes such as debayering, noise reduction and/or white balance correction. The output from the image processing module 112 is an image comprising a plurality of pixels represented by data values, e.g. luma and chroma values (in YUV colour space) or red, green and blue values (RGB values). The image outputted from the image processing module 112 is stored in the memory 110 for subsequent retrieval by the encoder module 122 of the encoder processing block 108.

The image outputted from the image processing module 112 is also passed to the image analysis module 114. In step S206 the image analysis module 114 analyses the pixels in one or more sections of the image. That is, the image comprises one or more image sections and the one or more image sections are analysed to estimate an indication of the complexity of each of the image sections. For example, an entropy of an image section may be used as an indication of the complexity of the image section. The entropy of an image section represents how many bits would be needed in order to encode the image section losslessly.

As an example, the image analysis module 114 may use a model based on a 2×2 luma kernel in which a prediction residual (or "delta value", $\Delta_{i,j}$) is the difference between an individual pixel luma value and the average (e.g. mean or median) of the 2×2 kernel to which it belongs. That is, for each of the pixels in an image section, a difference is determined between the value (e.g. the luma value) of that pixel and an average (e.g. mean) of the values of the pixels within a block of pixels (e.g. a 2×2 block) of the image section which includes that pixel. This is shown in equation (1) below, where $Y_{x,y}^{AVE}$ is the mean of the luma values of a 2×2 block of pixels with the origin of the 2×2 block at position x,y in pixel coordinates, and where $Y_{i,j}$ is the luma value of a pixel with an offset of i,j from the origin of the 2×2 block:

$$Y_{x,y}^{AVE} = \frac{1}{4}\left(2 + \sum_{i=0}^{i=1}\sum_{j=0}^{j=1} Y_{x+i,y+j}\right) \quad (1)$$

$$\Delta_{i,j} = Y_{x,y}^{AVE} - Y_{i,j}$$

The calculation shown by equation (1) is performed in integer arithmetic and the factor of '2' inside the brackets serves as a means of rounding to the nearest integer, rather than always rounding down. In this example, the model considers the differences between a pixel value and the average of the values of the other pixels within a 2×2 block of pixels including that pixel. More generally, in other examples, the differences may be determined between the value of a pixel and a prediction for that pixel derived from the values of a group of pixels comprising one or more nearby pixels. The group of pixels considered for a particular pixel may, or may not, include the particular pixel itself. In other examples different sized and/or shaped blocks of pixels (e.g. 3×3, 4×2 or n×1 blocks of pixels, where n is an integer) may be considered by the model.

Figure 3:
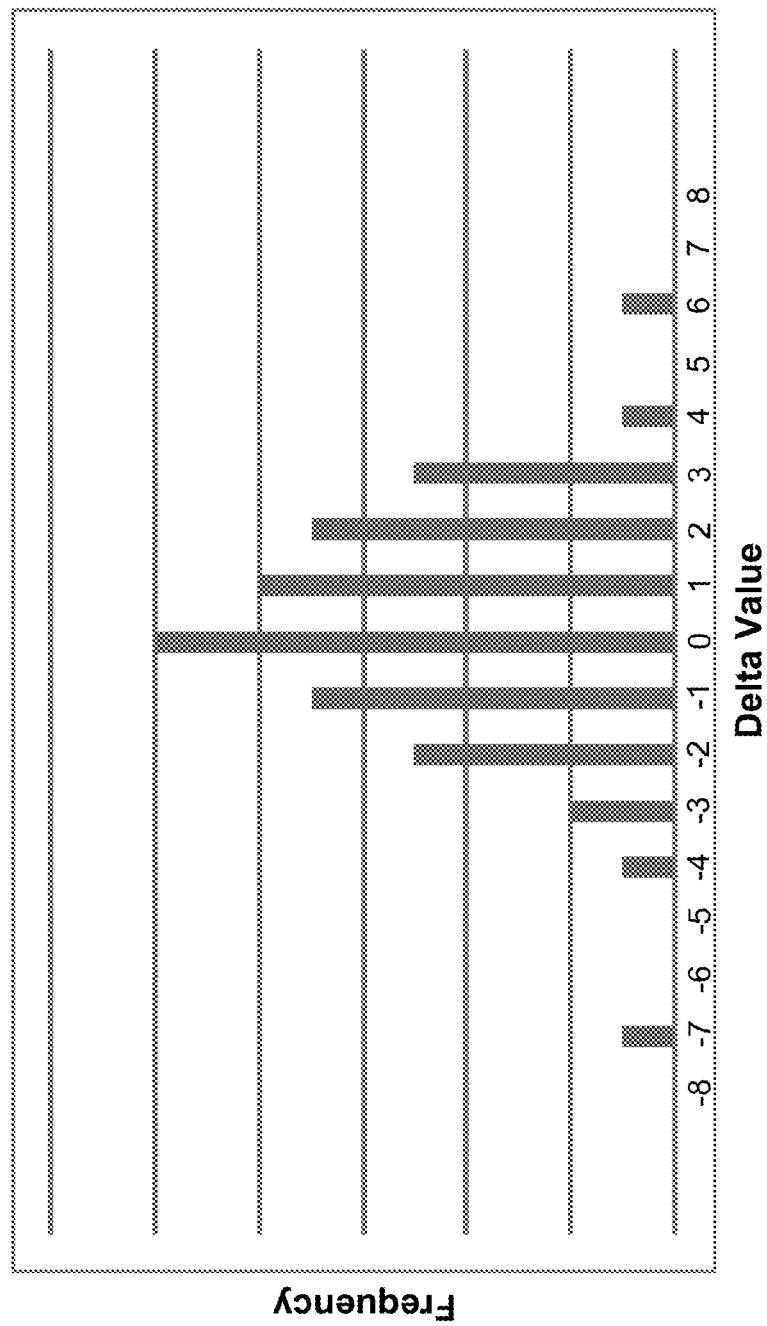
FIG. 3 shows a histogram of delta values for an image region.

The (signed) delta values, $\Delta_{i,j}$ for a region of the image can be plotted in a histogram, an example of which is shown in FIG. 3. An image region comprises a plurality of the blocks. For example, an image region may be a pair of pixel lines of the image (i.e. a line of the 2×2 blocks of pixels). This is a particularly useful choice of image region when the image is processed according to a raster scan. Just one linestore, which stores the values of a number (equal to the number of pixels in a line of the image) of pixels, is enough to determine the delta values for a pair of pixel lines. In other examples, an image region may comprise a different arrangement of pixels which can be divided into the blocks used in the model (e.g. 2×2 blocks), e.g. a rectangular (including square) region of pixels within the image. As a useful general example, which makes efficient use of a small number of linestores, the image region comprises one or more pixel lines within the image, wherein the number of pixel lines in the image region is equal to the height of the groups of pixels. In the example shown in FIG. 3, the histogram is peaked and centred on a delta value of zero. The sharpness of the peak in the histogram varies according to the content of the image and gives an indication of the entropy (i.e. the complexity) of the image region which broadly reflects the number of bits that will be required to code the image region in a largely codec-agnostic way. A sharp peak at zero in the histogram indicates that the pixels in the region are very similar to their neighbouring pixels, i.e. that the entropy in the image is low. In contrast, a wide peak in the histogram indicates that the pixels in the region are not very similar to their neighbouring pixels, i.e. that the entropy in the image is high. In general, there can be multiple histogram peaks of different widths, but the principles of the methods described herein can still be applied in those cases.

The entropy of image region r ($E_r$) can be estimated, in accordance with the standard definition of entropy, according to the equation:

$$E_r = \log_2(T) - \frac{1}{T}\sum_{k=0}^{K-1} b_k \log_2(b_k)$$

where K is the number of bins in the histogram, $b_k$ is the histogram occupancy of bin k and $T = \sum_{k=0}^{K-1} b_k$, such that T represents the total histogram occupancy, i.e. the number of pixels in the image region. The entropy of an image region serves as a useful metric of the information content within the image region. In particular, the entropy of the image region multiplied by the number of pixels in the image region gives a prediction of the number of bits that are needed to losslessly encode the image region.

In principle, provided that the entropy of the histogram is lower than the intrinsic bit depth of the pixel representation, it is possible to compress the set of 2×2 blocks included in the histogram by representing them with the average 2×2 value (which uses one quarter of the bits that four pixels use), plus a variable length code, or arithmetic code which encodes the differences $\Delta_{i,j}$ with fewer bits than the intrinsic differences would require.

As described above, the image region could take any form (which divides into the modelled blocks of pixels, e.g. 2×2 blocks of pixels). It would be possible to choose the entire image as the image region, but it may be more useful to have some information about localised entropy values within the image as well as the overall entropy for the image. For this reason, it may be helpful to use image regions that are smaller than the full image and a practical choice is a line-pair; i.e. two image lines.

A section of the image comprises one or more of the image regions and an estimate of the entropy for an image section can be found by summing the entropies of the image regions within that image section. The entropies of the image regions are summed to reduce the effect on the entropy of small detail in the image which may be exaggerated due to the simple model described above which considers small (e.g. 2×2) blocks of pixels. By way of an equation, an estimate of the total entropy of the mth image section (or "image vicinity"), $E_m$, which comprises R image regions is determined as:

$$E_m = T\sum_{r=0}^{r=R-1} E_r \quad (2)$$

It can be useful to work out the entropies over the image regions and then sum the image region entropies to give the entropy of an image section, as described above. If image regions were not used and instead the entropy of an image section was determined from the histograms of the 2×2 blocks then there would be many delta values and the information of small detail would be lost. Similarly, there is a trade-off to consider when determining the size of the image region. A smaller image region would provide information on smaller areas of detail in the image, but would have fewer data points in the histogram to consider, so the reliability of the data may be lower. The sizes of the blocks, image regions and image sections may be changed, e.g. to suit a particular set of images or to meet constraints, e.g. hardware constraints such as the number of linestores present for the image analysis module 114.

The total entropy of an image section $E_m$ is the sum of the entropies of the image regions it contains multiplied by the number of pixels in each image region. This gives an estimate of the number of bits that would be generated by losslessly encoding the image section. An estimate of the global entropy of the whole image can then be determined by summing the entropy of the one or more image sections within the image. Therefore, if M is the number of image sections in the image (where M≥1), then the global entropy of the image, $E_{image}$, is estimated as:

$$E_{image} = \sum_{m=0}^{m=M-1} E_m$$

Some encoders use 8×8 block-based coding to encode an image. It makes sense to measure regional entropies, and accumulate the regional results over an image section for which it is possible to also obtain actual counts of bits generated by the compression encoding algorithm. Therefore, as an example, an image region is a line pair, and an image section is a multiple of 8 lines of the image. For example, the image sections may be blocks of 256 (i.e. 32×8) lines of pixels, such that the entropy of a 1080 line image is estimated in approximately four quarters, with a bit of overhang. As another example, which was found to give slightly better correlation with respect to actual HEVC encoding bit counts, the image sections may be blocks of 120 (i.e. 15×8) lines of pixels, which divides exactly into 1080 nine times, i.e. the image is divided into nine image sections.

In step S210 a relationship is used to estimate the number of bits generated by encoding the image sections of the image for a plurality of quantization levels. The relationship is a function of the quantization level and is used to relate an indication of the complexity of an image section (e.g. the entropy of the image section $E_m$) to an estimate of the number of bits that would be generated by encoding that image section with the encoder module 122. The encoder module 122 may also be referred to herein simply as the "encoder". The relationship may be determined in an offline process prior to using the relationship to estimate the number of bits generated by encoding the image sections of the image. Details of the relationship and how it may be determined are described below.

Image regions which exhibit a relatively fine level of detail have a relatively high entropy. Similarly, image regions which exhibit a relatively coarse level of detail have a relatively low entropy. By implementing the model described herein for estimating the entropy of the image regions, it has been observed that—despite significant differences in algorithmic complexity—the simple 2×2 entropy predictor and the actual bits used by a HEVC reference encoder (coding at a fixed quantization parameter, QP=0 in I-frame only mode) exhibit quite strong similarities. This observation may be used to conclude that a simple pre-analysis step on the image to estimate the entropy of image sections as described above may be used to estimate the variation in bit usage in the significantly more complex HEVC encoding algorithm used by the encoder to encode the image.

Figure 4:
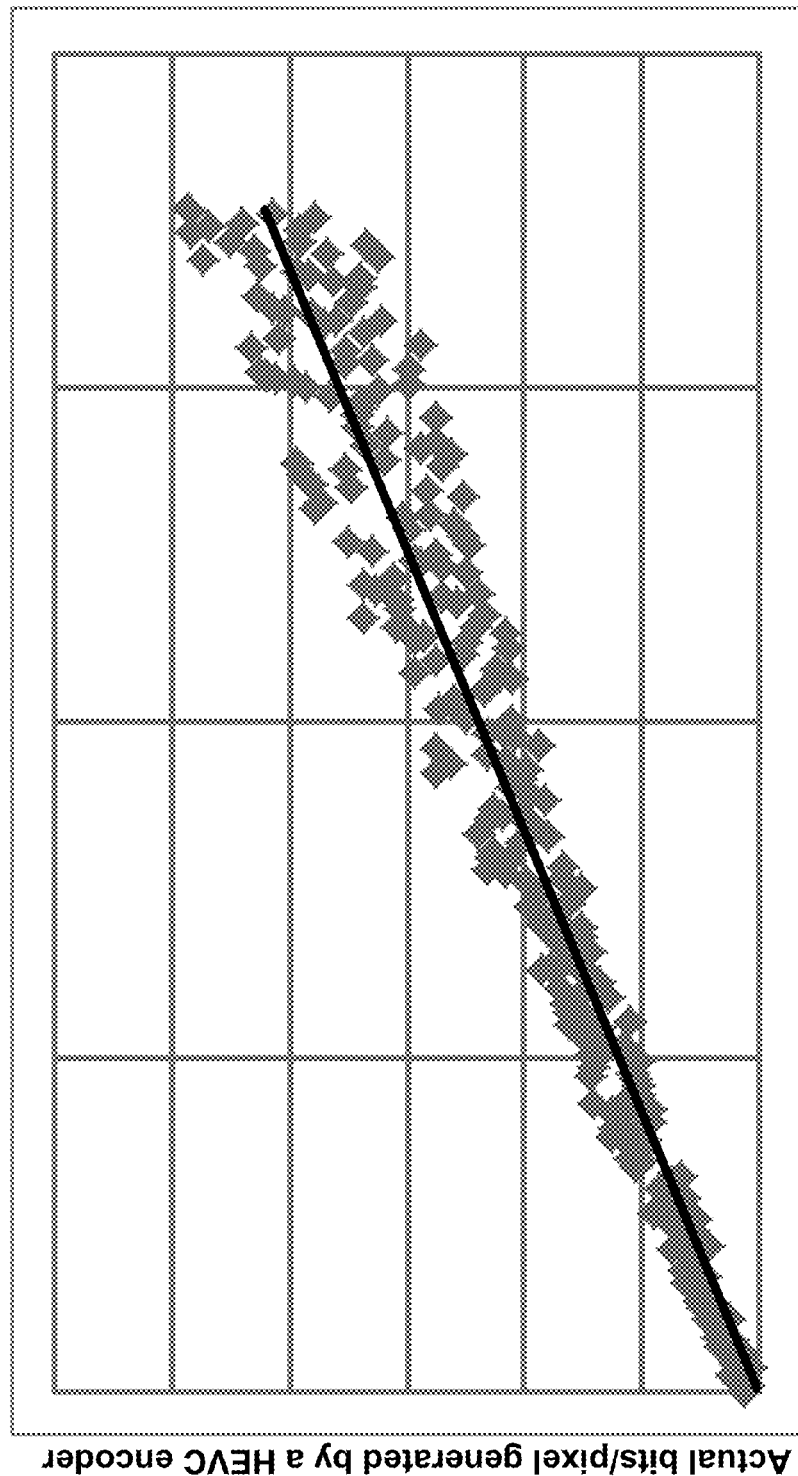
FIG. 4 shows a representation of a graph of the bits/pixel generated by a HEVC encoder against the bits/pixel predicted by a simple model.

FIG. 4 shows a representation of a graph of the bits/pixel generated by a HEVC encoder for an image section against the bits/pixel predicted by the simple 2×2 model described above for the image section, given by the estimate $E_m$. As shown in FIG. 4, a straight line can be fitted for the data in the graph. It can be seen in FIG. 4 that the correlation between the predicted number of bits and the actual measured number of bits generated by the encoder is not perfect, but there is still a correlation. From observations of one particular set of image sequences, a correlation coefficient has been found to be 0.92 for a graph of the predicted number of bits for an image and the actual observed number of bits generated by an HEVC encoder encoding the image. Given the simplicity of the 2×2 model, it may be considered surprising that the correlation is this good.

It can therefore be appreciated that the simple model (e.g. based on 2×2 blocks of pixels) enables an estimate to be made of the number of bits which would be generated by encoding any section of the image (e.g. lines or tiles of the image) that sub-divides into the blocks of pixels (e.g. 2×2 blocks of pixels), using an encoder (e.g. an HEVC encoder) with a quantization parameter QP equal to 0, i.e. essentially lossless intra coding. This can be generalized to enable a prediction for the number of bits for the whole image. It would be useful if the relationship that is determined in step S208 provided estimates of the number of bits generated by encoding an image with an encoder using quantization parameters which are greater than zero, i.e. for lossy encoding. According to the HEVC standard, the quantization parameter can take a value from 0 to 51. A quantization parameter is a measure of the quantization level used to encode an image. A quantization level may also be indicated with a step size (or quantizer interval), denoted Q. The quantisation step size, Q, and the quantization parameter, QP are related to each other and both describe a quantization level, but they are not defined as the same thing in the HEVC standard. That is, the quantization parameter (QP) is effectively a code for the step size (Q).

The model to predict the number of bits generated by encoding the image may operate on pixel values in the spatial or frequency domain. In very general terms, a prediction, in either spatial or frequency domains, only has a compression advantage if the distribution of samples is localised rather than flat. It is often the case that, the distributions (e.g. the histogram shown in FIG. 3) are approximately laplacian. Although this is a rough approximation, it is not unreasonable to model the histograms of the delta values as laplacian functions. In terms of predicting the compression that will be applied by the encoder, it is interesting to see how the quantization level affects the entropy of the laplacian functions. If this is done, it can be shown that, starting with a normalised laplacian probability density function, the entropy of the discretely quantised laplacian distribution, $E(\sigma, Q)$, is given by:

$$E(\sigma, Q) = -(1 - e^{-\sigma Q/2})\log_2(1 - e^{-\sigma Q/2}) + \frac{\sigma Q}{\ln(2)}\left(\frac{e^{\sigma Q/2}}{e^{\sigma Q/2} - 1}\right) - e^{-\sigma Q/2}\log_2\left(\frac{1}{2}(e^{\sigma Q/2} - e^{-\sigma Q/2})\right)$$

where $\sigma$ is the scale parameter of the laplacian distribution.

Figure 5:
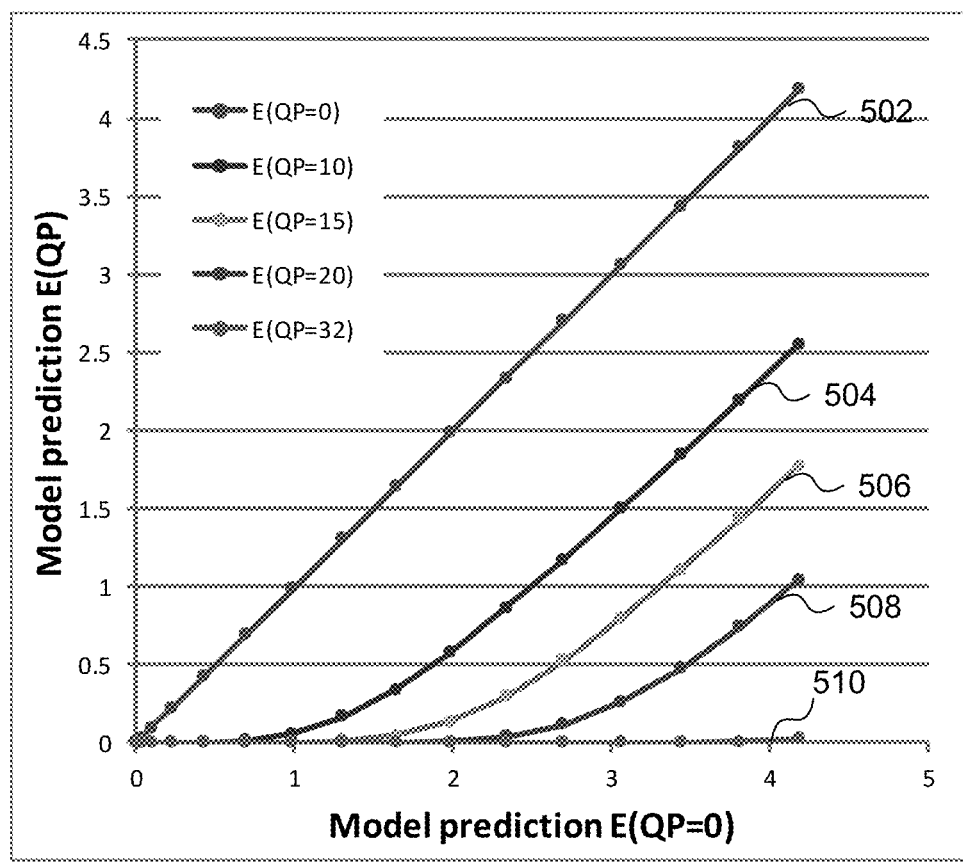
FIG. 5 shows a graph of the entropy of a Laplacian distribution at different quantization levels against the entropy of the Laplacian distribution at a minimum quantization level.

FIG. 5 shows a plot of $E(\sigma, Q)$ versus $E(\sigma, 1)$, where the values of the step size, Q, have been determined from a quantisation parameter, QP, with the relationship $Q = e^{0.115525 \times QP}$ which closely approximates the relationship between Q and QP in the HEVC standard in which an increase of 6 in QP relates to a doubling of the step size Q. Thus, in this example, a quantization parameter of zero corresponds to a step size of 1 and a quantization parameter of 51 corresponds to a step size of approximately 362.

The curves shown in FIG. 5 are parametric plots i.e. both x and y values are dependent variables, with the independent variable being $\sigma$, the scale parameter. The curve labelled 502 shows the reference line of the entropy predicted by the model for QP=0. The curve labelled 504 shows the entropy predicted by the model for QP=10 as a function of the entropy for QP=0. The curve labelled 506 shows the entropy predicted by the model for QP=15 as a function of the entropy for QP=0. The curve labelled 508 shows the entropy predicted by the model for QP=20 as a function of the entropy for QP=0. The curve labelled 510 shows the entropy predicted by the model for QP=32 as a function of the entropy for QP=0.

Observations show that there is a non-linear relationship between the number of bits generated by an HEVC encoder as a function of the quantization level (e.g. the quantization parameter) used by the encoder. The general form of behaviour and variation with quantizer parameter QP exhibited in the analytic model shown in FIG. 5 is very similar to the corresponding behaviour and variation with quantizer parameter QP observed in actual bit counts of images encoded with a HEVC encoder. The same behaviour and variation with quantizer parameter QP would be observed with other types of encoder (other than an HEVC encoder) also. That is, the general pattern of behaviour (that is, the non-linearity) seen in FIG. 5 is a fundamental process which is a consequence of discrete quantisation of the histograms of the delta values described above, rather than the precise way in which the prediction is formed. In other words, the strength of the evidence is that, the general variation of the curves in FIG. 5 is not specific to the HEVC standard.

Figure 6:
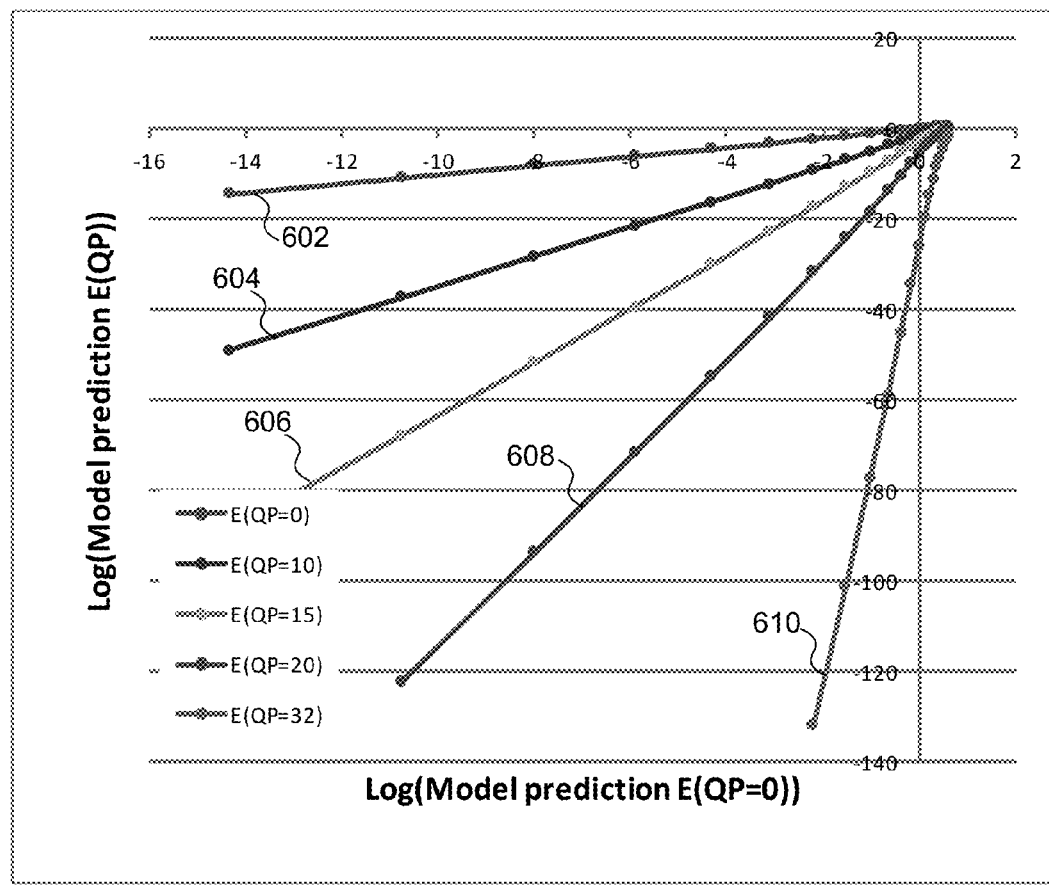
FIG. 6 shows a graph of the logarithm of the entropy of a Laplacian distribution at different quantization levels against the logarithm of the entropy of the Laplacian distribution at a minimum quantization level.

FIG. 6 shows the same data as that shown in FIG. 5, but in FIG. 6 logarithms of the values on both axes are taken before plotting the graph. That is, FIG. 6 shows a plot of $\log(E(\sigma, Q))$ versus $\log(E(\sigma, 1))$, again for the example in which the values of the step size, Q, have been determined from a quantisation parameter, QP, with the relationship $Q=e^{0.115525 \times QP}$ which approximates the relationship between Q and QP in the HEVC standard. The curve labelled 602 shows the reference line of the logarithm of the entropy predicted by the model for QP=0. The curve labelled 604 shows the logarithm of the entropy predicted by the model for QP=10 as a function of the logarithm of the entropy for QP=0. The curve labelled 606 shows the logarithm of the entropy predicted by the model for QP=15 as a function of the logarithm of the entropy for QP=0. The curve labelled 608 shows the logarithm of the entropy predicted by the model for QP=20 as a function of the logarithm of the entropy for QP=0. The curve labelled 610 shows the logarithm of the entropy predicted by the model for QP=32 as a function of the logarithm of the entropy for QP=0. It can be seen from FIG. 6 that, despite the algebraic inelegance of the expression given above for $E(\sigma, Q)$, a significant part of the non-linearity is logarithmic, and once this is taken out the variation with quantization level is approximately linear or slightly quadratic.

To a reasonable approximation, it is possible to associate the log of the complicated expression given above for the entropy at a given QP value ($E(\sigma, Q)$), to the log of the same expression at a QP=0 ($E(\sigma, 1)$), using a simple quadratic approximation, i.e.:

$$y \approx F_A(Q)x^2 + F_B(Q)x + F_C(Q)$$

where $y = \log_{10}(E(\sigma, Q))$ and $x = \log_{10}(E(\sigma, 1))$, and where $F_A$, $F_B$ and $F_C$ are coefficients of the quadratic equation which for a given encoder depend upon the quantization level, given by the step size Q. This approximation is completely analytic, and generic. It is independent of any specific image compression algorithm.

Figure 7:
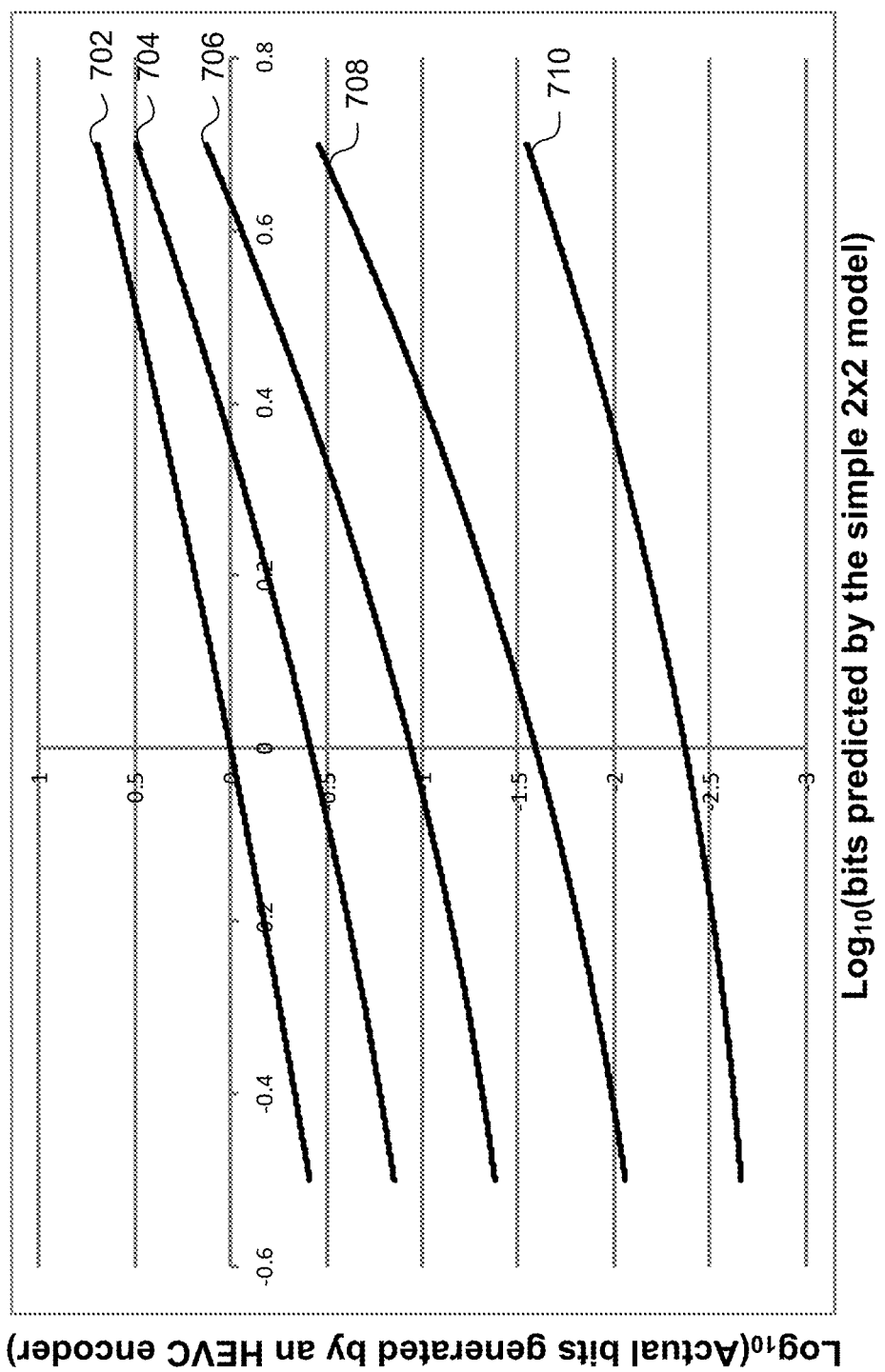
FIG. 7 shows a graph of the logarithm of the number of bits generated by a HEVC encoder using different quantization levels against the logarithm of the number of bits predicted by a simple model.

A corresponding approximation can be made for the relationship between the entropy of the image sections determined according to the model described above and an estimate of the number of bits that would be generated by encoding the image sections with an encoder. A graph of the logarithm of the number of bits that are generated by encoding image sections using an HEVC encoder against the logarithm of the number of bits predicted by the 2×2 model has been plotted for different quantization levels of the HEVC encoder. FIG. 7 shows curves of best fit for the data (the actual data is not shown in FIG. 7 for clarity) which follow a polynomial equation, e.g. a quadratic equation with the form $y \approx A(QP)x^2 + B(QP)x + C(QP)$, where A, B and C are coefficients of the quadratic equation which depend upon the quantization parameter, QP. The actual data shows some variation from the curves of best fit shown in FIG. 7, but the general trends of the actual data follow the curves of best fit.

The curve labelled 702 shows the curve of best fit of the logarithm of the number of bits that are generated by encoding image sections using an HEVC encoder for QP=0 as a function of the logarithm of the number of bits predicted by the 2×2 model for QP=0. The curve of best fit 702 has the equation $y = A(QP=0)x^2 + B(QP=0)x + C(QP=0)$. The curve labelled 704 shows the curve of best fit of the logarithm of the number of bits that are generated by encoding image sections using an HEVC encoder for QP=10 as a function of the logarithm of the number of bits predicted by the 2×2 model for QP=0. The curve of best fit 704 has the equation $y = A(QP=10)x^2 + B(QP=10)x + C(QP=10)$. The curve labelled 706 shows the curve of best fit of the logarithm of the number of bits that are generated by encoding image sections using an HEVC encoder for QP=15 as a function of the logarithm of the number of bits predicted by the 2×2 model for QP=0. The curve of best fit 706 has the equation $y = A(QP=15)x^2 + B(QP=15)x + C(QP=15)$. The curve labelled 708 shows the curve of best fit of the logarithm of the number of bits that are generated by encoding image sections using an HEVC encoder for QP=20 as a function of the logarithm of the number of bits predicted by the 2×2 model for QP=0. The curve of best fit 708 has the equation $y = A(QP=20)x^2 + B(QP=20)x + C(QP=20)$. The curve labelled 710 shows the curve of best fit of the logarithm of the number of bits that are generated by encoding image sections using an HEVC encoder for QP=32 as a function of the logarithm of the number of bits predicted by the 2×2 model for QP=0. The curve of best fit 710 has the equation $y = A(QP=32)x^2 + B(QP=32)x + C(QP=32)$. As an example, for a particular set of images, typical correlation values for such curves fitted to data from a reference HEVC encoder have been found to be approximately 0.9.

The relationship (as shown in FIG. 7) between the logarithm of the observed number of bits generated by the HEVC encoder and the logarithm of the number of bits predicted by the 2×2 model exhibits a slightly stronger quadratic nature than the relationship (as shown in FIG. 6) between the logarithm of the predicted entropy at a quantization level given by a step size Q ($\log(E(\sigma, Q))$) and the predicted entropy at a quantization level given by a step size Q=1 ($\log(E(\sigma, 1))$). However, the correlation coefficients for the curves of best fit shown in FIG. 7 are high enough for the approximation to a quadratic equation to be a useful approximation. The relationship between the observed number of bits generated by the HEVC encoder and the number of bits predicted by the 2×2 model would be different for different types of encoder. However, since the entropies predicted by the model (as shown in FIG. 6) show the same form of relationship (i.e. a relationship which can be approximated with a quadratic equation) there is some confidence that there are underlying grounds for performing such a quadratic fit, and that the corresponding relationships for different types of encoders would follow the same general form (i.e. can be approximated using a quadratic equation). For different types of encoders, the coefficients of the quadratic equation would be different, and may be determined by experimentation or observation.

Figure 8:
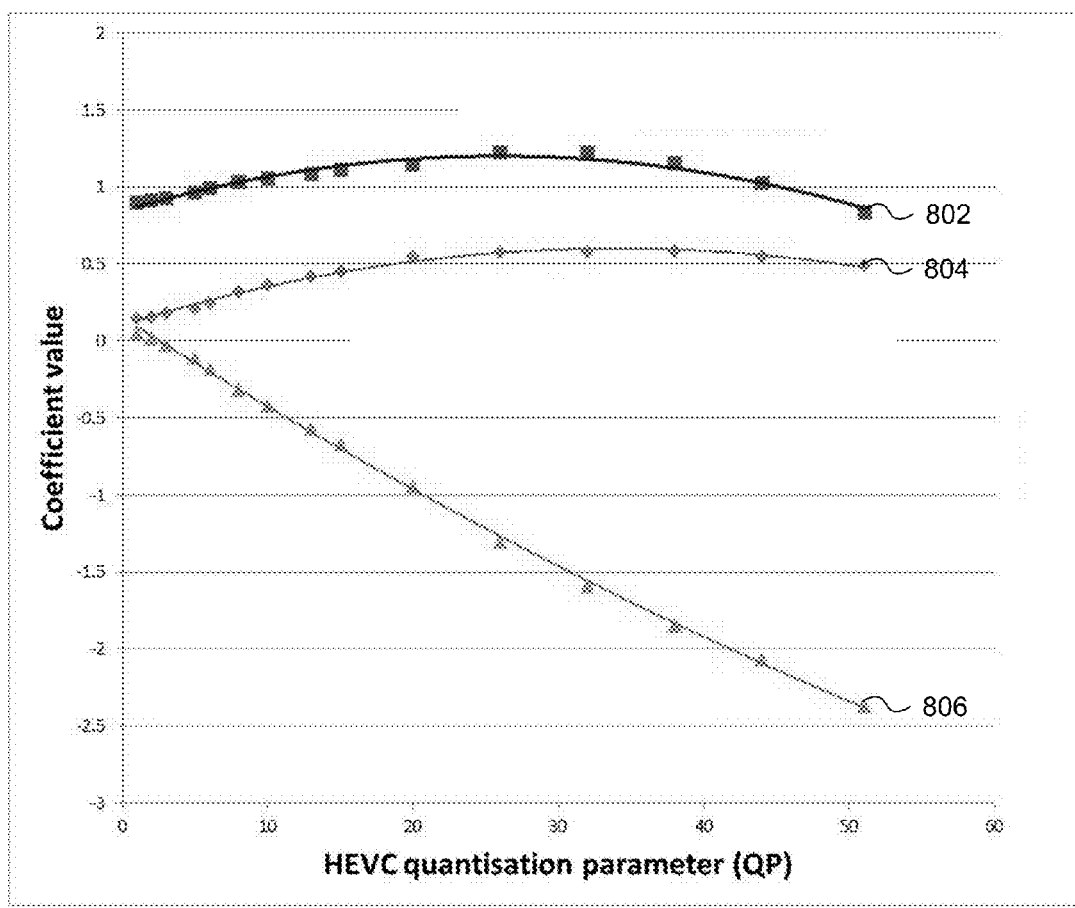
FIG. 8 shows a graph of coefficients of a quadratic equation relating the logarithm of the number of bits generated by a HEVC encoder to the logarithm of the number of bits predicted by a simple model against a quantization parameter used by a HEVC encoder.

FIG. 8 shows a graph of the coefficients (A, B and C) of the quadratic equation relating the logarithm of the number of bits generated by a HEVC encoder to the logarithm of the number of bits predicted by the simple model against a quantization parameter (QP) used by the HEVC encoder. A curve of best fit labelled 802 is plotted through the values of A. Similarly, a curve of best fit labelled 804 is plotted through the values of B, and a curve of best fit labelled 806 is plotted through the values of C. The variation of A, B and C as a function of quantization parameter, can also be represented by quadratic curves which fit the data, and in one example have been found to have correlation coefficients of better than 0.98. Thus, for each of A, B and C, (802, 804 and 806) a quadratic of the form $y=ax^2+ba+c$ is fitted where a, b and c are constants which are specific to the type of the encoder. In particular, the coefficients A, B and C are given by:

$$\begin{pmatrix} A \\ B \\ C \end{pmatrix} = \begin{pmatrix} a_A & b_A & c_A \\ a_B & b_B & c_B \\ a_C & b_C & c_C \end{pmatrix} \begin{pmatrix} QP^2 \\ QP \\ 1 \end{pmatrix} \quad (3)$$

where the constants of the matrix ($a_A$, $b_A$, $c_A$, $a_B$, $b_B$, $c_B$, $a_C$, $b_C$ and $c_C$) are found by observation and are specific for a type of encoder (e.g. for an HEVC encoder). The values of the constants in the matrix may be stored in a look up table which is accessible by the image processing system. The determination of these constants and the storage of these constants in the look up table may be performed offline, i.e. prior to using the relationship in step S210.

Combining the lossless entropy estimate model and the quadratic fit to the log-log plot of lossless entropy estimate versus actual HEVC bitrate at a given quantization parameter, QP, an estimate, $B_m^H(QP)$, of the average number of bits per pixel generated by encoding an image section, m, with an HEVC encoder, H, at a quantization parameter, QP, is given by the relationship:

$$B_m^H(QP) = 10^{A\epsilon_m^2 + B\epsilon_m + C} \quad (4)$$

where $$\epsilon_m = \log_{10}\left(\frac{E_m}{\Omega}\right)$$

and where $E_m$ is the entropy of the mth image section determined as described above, e.g. using the simple 2×2 model, and where Ω is the number of pixels per image section. For example, an image section may include 120 (that is, 15×8) rows of pixels of the image, such that Ω=120L, where L is the number of pixels in one row of the image.

The number of bits generated by encoding each of the image sections in the image can be summed together to provide an estimate, $ImageBits^H(QP)$, of the number of bits generated by encoding the whole image with an HEVC encoder at a quantization parameter QP, such that $$ImageBits^H(QP) = \Omega \Sigma_{m=0}^{m=M-1} B_m^H(QP) \quad (5)$$

where M is the number of image sections in the image. Although in the description above, $ImageBits^H(QP)$ and $B_m^H(QP)$ are given in terms of numbers of bits, they could instead be given in terms of bitrates.

So that the relationship can be used in step S210, the coefficients of the equation can be obtained for the type of the encoder. For example, the look up table may be accessed to determine the matrix of constants which have been determined previously (e.g. by observation) for the type of the encoder used by the encoder module 122 (e.g. a HEVC encoder). The matrix of constants can be used with equations (3) and (4) to provide the relationship between $E_m$ and $B_m^H(QP)$. It is noted that the relationship is a function of the quantization level (e.g. the quantization parameter) used by the encoder.

As an example, in step S210, the estimate of the number of bits generated by encoding the image sections of the image using an HEVC encoder ($ImageBits^H(QP)$) may be determined for all of the quantization parameter values that are allowed for use by the encoder (e.g. according to the HEVC standard, 52 quantization parameter values are allowed). In other examples, the estimate of the number of bits generated by encoding the image sections of the image using an HEVC encoder ($ImageBits^H(QP)$) may be determined for a subset of all of the allowed quantization parameter values, e.g. for half of the allowed quantization parameter values. The subset of the allowed quantization values may be determined based on other information. For example, if the image is a frame of a video sequence, and the quantization parameter selected for the previous frame of the video sequence is known (e.g. to be 20), then a subset of the allowed quantization parameter values for which $ImageBits^H(QP)$ is determined may be grouped around the quantization parameter value of the previous frame (e.g. in a group including all of the quantization parameter values from QP=10 to QP=30). Step S210 is performed by the bit estimation module 116 in the image pre-processing block 106.

In step S212 the quantization level selection module 118 selects one of the quantization levels (e.g. quantization parameters) for use by the encoder module 122 to encode the image. The quantization level selection module 118 selects the quantization level based on a target number of bits (a "target bit budget") for the encoded image and based on the estimated indications of the number of bits that would be generated by encoding the image using the different quantization levels as determined in step S210. The target number of bits may be indicated as a number of bits or as a bitrate. For a given frame rate, a bitrate can be considered as equivalent to a number of bits per frame. It is the "target" number of bits in the sense that it is the number of bits of the encoded image that the rate controller 120 is aiming for, such that the buffer which receives the encoded image does not saturate or completely deplete. For example, the quantization level for which the estimate of the number of bits that would be generated by encoding the image is closest to the target number of bits may be selected. This can be expressed as:

selected_$QP$=argmin$_{QP}${|ImageBits$^H$($QP$)−Target bit budget|}

In step S214 the selected quantization level is sent, as metadata, from the image pre-processing block 106 to the rate controller 120. Then in step S216 the rate controller 120 uses the selected quantization level to determine a quantization level to be used by the encoder module 122 to encode the image. The rate controller 120 may "determine" the quantization level simply by receiving the selected quantization level from the image pre-processing block 106 and in that case, the rate controller 120 may send an indication of the quantization parameter selected in step S212 to the encoder module 122 whereby the encoder module 122 then encodes the image using that quantization parameter. The rate controller 120 may consider other factors as well as the selected quantization parameter (selected by the quantization level selection module 118) when determining the quantization parameter to be used by the encoder 122. For example, where the image is a frame of a video sequence then the change in quantization parameter from that used to encode one or more previous frames of the video sequence may be a factor for the rate controller 120 to consider when determining the quantization parameter for encoding the current image. It may be desirable to avoid large changes in the quantization parameter used to encode different frames of a video sequence. The encoder module 122 receives the uncoded image from the memory 110. The uncoded image was stored in the memory 110 as part of step S204. The encoder module 122 encodes the image using the quantization parameter indicated by the rate controller 120 and according to the encoding standard that it is configured to implement (e.g. according to the HEVC encoding standard) to thereby generate an encoded image. Details of the encoding process implemented by the encoder module 122 are beyond the scope of this description and are known to those skilled in the art, and as such, are not discussed herein.

The encoded image may be sent (e.g. via a buffer of the encoder processing block, not shown in FIG. 1) to the memory 110 wherein the quantization parameter is controlled by the rate controller 120 such that the encoder can output encoded image data to the memory 110 at a regulated (e.g. constant or near-constant) bitrate. In other examples, the encoded image may be sent from the encoder processing block 108 to somewhere other than the memory 110. For example, the encoded image may be sent from the encoder processing block 108 to a decoder or a packetizer, which are not shown in FIG. 1. An indication of the encoded bitrate (e.g. the number of bits in the encoded image) is provided as feedback from the encoder module 122 to the rate controller 120. The rate controller 120 uses the feedback with an indication of the target bit budget and the metadata received from the image pre-processing block 106 to adaptively control the quantization parameter used by the encoder module 122 to encode the image. As is known in the art, the rate controller 120 can use the feedback from the encoder module 122 to adapt the quantization parameter while the encoder module 122 encodes an image. In this way the quantization level used by the encoder module 122 is fine-tuned by the rate controller 120 during the encoding process. Although the quantization level selected as described above is close to the optimum quantization level used by the encoder for encoding the image, it may not be exactly equal to the optimum quantization level used by the encoder for encoding the image in accordance with the target bit budget. As an example, observations indicate that the model described herein predicts the optimum quantization parameter to an accuracy of approximately ±1 over the lower half of the quantization parameter range, and approximately ±2.5 over the upper half of the quantization parameter range for a HEVC encoder. It may be considered surprising that the prediction is this good over such a wide range of quantization levels and for such a simple model. The slight inaccuracy of the selected quantization level is due to the selection being based on some approximations and simplifications as can be appreciated from the above description.

Providing a quantization level which is close to the optimum quantization level used by the encoder is useful, and means that the rate controller 120 can be more relaxed in adapting the quantization parameter used by the encoder module 122 based on the feedback (because the original quantization parameter is close to the optimum quantization parameter). That is, the rate controller 120 may react more slowly when the quantization level does not seem to be right based on encoding a first portion of an image, because the quantization level has been estimated based on the whole image, and it is likely that in this situation a latter portion of the image has a different level of detail compared to the first portion of the image which is why the quantization level may not have seemed correct based solely on the encoding of the first portion of the image. In this sense, the rate controller 120 will not have such a strongly adverse reaction to uneven distributions of detail within an image.

We note that in some examples, more than one quantization level may be selected, e.g. for different sections of an image, by the quantization level selection module 118 and indicated in the metadata received by the rate controller 120, such that the rate controller 120 will know that a change in quantization parameter may be beneficial for encoding different sections of the image.

There is provided an image processing system which performs simple pre-analysis of an image to provide an estimate of a quantization level to be used to encode an image in accordance with a target bit budget, wherein an estimate of the quantization level can be determined for an I-frame based on analysis of the same image (i.e. not based on other images) and wherein the quantization level is determined without the image having already been encoded by the encoder module 122 (there is often not enough time and/or processing power available to the image processor 104 to encode an image more than once where the image is to be encoded in real-time). Therefore, the image processing system allows images to be encoded in real-time, e.g. as they are captured by an image sensor 102, and provides information to the rate controller 120 so that the quantization level used by the encoder is at least close to the optimum quantization level used to encode the image in accordance with the target bit budget (e.g. the quantization parameter is within approximately ±2 of the optimum quantization parameter for encoding the image). The estimate of the quantization level is determined using a relatively simple method (which can be implemented in real-time without significantly adversely affecting the processing power or speed of the encoding of the image). Any slight inaccuracy in the estimated quantization parameter can be adapted for by the rate controller 120 as the encoder module 122 encodes the image, as is known in the art.

In examples described above, and as shown in FIG. 1, image data is captured by an image sensor 102. The image data is passed to the image pre-processing block 106. The image pre-processing block 106 uses the image processing module 112 to process the image data to provide an image. The image sensor is associated with the pre-processing block 106 for processing the image in the image processing module 112. In examples described herein, the analysis of the image for selecting a quantization level can be performed in the same pre-processing block 106, since this provides a useful opportunity to pre-process the image data. The image pre-processing block 106 includes structures, such as linestores, for use by the image processing module 112, and these same structures can be used for the pre-processing of the image as described herein, without needing to add a further pre-processing block. The image pre-processing block 106 (in particular, the image analysis module 114) analyses the pixels in one or more image sections of the image to estimate indication(s) of the complexity of the image section(s). The indication(s) of the complexity may be entropies which may be estimated as described above using a simple 2×2 model. The image pre-processing block 106 uses the indication(s) of the complexity of the image section(s) to determine metadata which is outputted from the image pre-processing block 106 to the encoder processing block 108. The encoder processing block 108 (in particular, the rate controller 120) uses the metadata received from the image pre-processing block 106 to determine a quantization level (e.g. a quantization parameter) for use in encoding the image which is then passed to the encoder module 122. The encoder module 122 encodes the image using the quantization level determined by the rate controller 120. In this way, the image data is captured by the image sensor 102, processed by the image pre-processing block 106 to provide an image which is stored in memory 110 and to determine metadata relating to the complexity of the image which is then passed to the encoder processing block 108 and used by the rate controller 120 to determine the quantization level used by the encoder module 122 for encoding the image. This process can proceed without interaction from a host application which initiated the capture of the image data. This results in faster processing of the image because the host application does not need to read, write or process the image data during the processing of the image. It is convenient to use the image pre-processing block 106 to analyse the image because the image pre-processing block 106 is used to process the image data captured by the image sensor 102, and as such it will have access to the image which it can then analyse to determine the metadata without requiring a separate read operation of the image from the memory 110 specifically for the purpose of analysing the image before the encoder processing block 108 encodes the image.

The metadata is not a version of the image, e.g. a processed version of the pixel values of the image. Rather, the metadata comprises information relating to the image, based on an analysis of the image, which can be used as an indication of how the image may be encoded. As described above, the metadata may be a quantization level which has been selected based on the analysis of the image and based on the target bit budget for the image. In this case it is simple for the rate controller 120 to use the selected quantization level to provide an indication of a quantization parameter to the encoder module 122 for use in encoding the image.

In other examples, the metadata may be the indication(s) of the complexity (e.g. the entropy) of the image section(s), regions or blocks outputted from the image analysis module 114. In this case the bit estimation module 116 and the quantization level selection module 118 may be implemented in the encoder processing block 108 instead of in the image pre-processing block 106. Therefore, the encoder processing block 108 may use the metadata (e.g. the entropy(ies) of the image section(s)) to estimate, for each of a plurality of candidate quantization levels, an indication of the number of bits that would be generated by encoding the one or more image sections in the image using the respective candidate quantization level, and then selects one of the plurality of candidate quantization levels based on the target number of bits and based on the estimated indications of the number of bits that would be generated by encoding the one or more image sections in the image using the respective candidate quantization levels. The selected quantization level is then used by the rate controller 120, as in the examples described above, to control the quantization parameter used by the encoder module 122 in encoding the image. In other examples, all of the functionality of the image analysis module 114, the bit estimation module 116 and the quantization level selection module 118 could be implemented in the encoder processing block 108.

Furthermore, in some examples, the image pre-processing block 106 may not include the image processing module 112. The image pre-processing block 106 receives the image, e.g. from the memory 110, wherein a different processing block or module has previously stored the image in the memory 110. The image processor 104 may be operated on any image which comprises a plurality of pixels to thereby analyse the image to estimate a complexity of the image and to thereby select a suitable quantization level based on the estimated complexity of the image and based on a target number of bits for the encoded image, and to encode the image according to the selected quantization level. The image processing module 112 might not be included in the image processor 104 and the image pre-processing block 106 might not receive data from an image sensor. Therefore, in some examples, steps S202 and S204 are replaced by a step of receiving an image at the image pre-processing block 106, e.g. from the memory 110, or from some other processing block. That is, the examples described above are described in relation to images which are captured by the image sensor 102, but the methods described herein can be used on any suitable images, irrespective of how the images are captured or generated. That is, the methods described herein could be used with any suitable type of image. For example, the methods could be used with computer-generated images which are rendered by a graphics processing unit (GPU), or with images which are screen-shots of a display of a device, or with images which are retrieved from a memory. In some examples, the image may be a combination of different types of image, such as a combination of an image captured by an image sensor and a computer-generated image. A computer-generated image may show any suitable image, such as a graphical user interface, or a view of a 3D scene for use in a computer game. Methods for rendering computer-generated images with a GPU are known in the art and as such are not described in detail herein. It may be particularly useful to use the methods described herein for computer-generated images generated by a GPU to thereby select a quantization level for use by an encoder in encoding the computer-generated image because the images may be required to be generated, encoded, and transmitted in real-time, e.g. for interactive use. For example, an image or sequence of images may be transmitted from one device to another device, such as from one computer to another computer, or from a computer to a peripheral device such as a display. Encoding the images is beneficial when the transmission is over a channel with limited capacity, such as a computer network or wireless interconnect.

Furthermore, it may be particularly useful to use the methods described herein for screen-shots of a display because a screen-shot may be used in real-time. A screen-shot may be a single image representing an image that is displayed on a display at a single instant in time. Furthermore, multiple screen-shots may be used to provide a real-time representation of a sequence of images that are displayed on a display over a period of time. A screen-shot may be transmitted from one device to another device (e.g. over the internet) in a communication session (e.g. a conference call), thereby facilitating screen sharing. For example, the transmission of a sequence of screen-shots between two devices may allow real time desktop sharing for example in a video conference, such that all of the participants of the video conference can view the contents of the screen of one of the participants in real-time during the communication session.

In the example of an image rendered by a GPU, the GPU may render the image as a plurality of tiles. A tile is a rectangular (including square) region of pixels, typically of the order of 16×16 or 32×32 pixels in size. Tiles may be rendered in an arbitrary order, and rendered pixel data may be collected in a frame buffer memory such that it may be encoded in a different order to that in which it was rendered. In order to avoid the need to re-read pixel data for analysis, parts of the image analysis block 114 may be integrated into the GPU. For example, if the size of an image region for which an entropy is determined is selected to be equal to the tile size, then the GPU may compute the histogram of a tile before writing the tile's pixel data to the frame buffer. Alternatively, an image region for which an entropy is determined may comprise a plurality of tiles, in which case the histogram for the image region may be accumulated from the histograms of its tiles, as each tile is rendered by the GPU. Entropy measures for the image regions within an image section may then be computed from the histograms, and summed, as described above, to estimate the number of bits required to encode the image section, where the size and shape of the image section are appropriate to the image encoding process. The computation of entropy measures, and the summation, may also be performed using the GPU.

In the examples described above, the image is sent from the image pre-processing block 106 to the memory 110 and then read from the memory 110 by the encoder processing block 108. In other examples, the image may be sent from the image pre-processing block 106 to the encoder processing block 108, e.g. without going via the memory 110.

The examples described above are described in relation to intra coded images in which the image is encoded without reference to other images (e.g. other frames of a video sequence). Similar principles apply to inter encoding images in which an image is encoded with reference to other images (e.g. other frames of a video sequence). Inter (or "non-intra") encoded frames of a video sequence may, for example, be: (i) P-frames which can reference data from previous frames and are compressed more than I-frames, or (ii) B-frames which can reference both previous and forward frames to get the highest amount of data compression. The predicted number of bits generated by encoding an image as a P-frame or a B-frame will be lower than that predicted for an Intra frame (an "I-frame"). However, it is more complicated to predict the number of bits that will be generated when a non-intra frame is encoded compared to the prediction for an intra frame. This is because the encoding process is more complicated for non-intra frames and may for example use motion vectors. It is difficult to fully consider motion vectors in a pre-processing stage (e.g. in the image pre-processing block 106) cheaply, i.e. without using too much processing power or time. It may be the case that the benefit of the pre-processing is reduced as the processing power or time required to perform the pre-processing increases. We describe below two examples of how the method may be adapted cheaply for use with non-intra frames. As a first example, the simple model described above for predicting the number of bits generated by encoding an image by Intra encoding may be adapted for use in predicting the number of bits generated by encoding an image by Inter encoding, by dividing the predicted number of bits by a factor which is greater than 1 (or multiplying by a corresponding reciprocal factor which is between 0 and 1). The factor can be determined based on observations and may be different for different types of encoder and may be different for P-frames and B-frames (e.g. the factor for a P-frame may be smaller than the factor for a B-frame because an encoded B-frame usually has fewer bits than an encoded P-frame). As a second example, difference values could be determined for pixels in an inter frame based on the values of corresponding pixels in other frames based on which the inter frame is to be encoded (assuming that all motion vectors are zero). These difference values can then be used in a similar manner to the delta values described above, which are histogrammed and then used to determine the entropy of image regions, image sections and/or the whole image. Depending upon the content in the image, the first example may or may not perform better (i.e. more accurately estimate the number of bits generated by encoding the inter frame) than the second example.

Generally, any of the functions, methods, techniques or components described above can be implemented in modules using software, firmware, hardware (e.g., fixed logic circuitry), or any combination of these implementations. The terms "module," "functionality," "component", "block" and "logic" are used herein to generally represent software, firmware, hardware, or any combination thereof. In the description, where these elements are used in conjunction with a functional description of a process or actions performed by such element, such disclosure describes circuitry, formed from one or more of circuitry resulting from configuration using program instructions, and from fixed-function circuitry, or circuitry configurable by provision of parameters, for example.

In the case of a software implementation, the module, functionality, component or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component or logic may include circuitry that is fixed function and circuitry that can be programmed to perform a function or functions; such programming may be provided from a firmware or software update or control mechanism. In an example, hardware logic has circuitry that implements a fixed function operation, state machine or process. Hardware logic also can be configurable according to configuration data supplied from a source of configuration data, such as microcode, or instruction data.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing block comprising any apparatus described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. An image processor, comprising:
   an image pre-processor configured to:
   receive image data which is to be processed to provide an image,
   process the received image data to provide the image, said image including at least one image section having a plurality of pixels,
   analyse the pixels in the image section to estimate an indication of the complexity of the image section,
   determine metadata based on the estimated indication of the complexity of the image section, and
   output the determined metadata; and
   an encoder configured to:
   receive the metadata determined by the image pre-processor,
   use the received metadata to determine a quantization level for use in encoding the image, and
   encode the image using the determined quantization level.

2. The image processor of claim 1, wherein the image pre-processing block is configured to send the image to a memory for storage therein, and wherein the encoder processing block is configured to receive the image from the memory.

3. The image processor of claim 2 wherein the memory is external to the image processor.

4. The image processor of claim 1 wherein the image pre-processing block is configured to send the image to the encoder processing block.

5. The image processor of claim 1 wherein the encoder processing block comprises a rate controller and an encoder module, wherein it is the rate controller that is configured to receive the metadata determined by the image pre-processing block and to use the received metadata to determine a quantization level for use in encoding the image, and wherein it is the encoder module that is configured to encode the image using the determined quantization level.

6. The image processor of claim 1 wherein the metadata comprises said one or more estimated indications of the complexity of the one or more image sections, and wherein the encoder processing block is configured to:
   use the one or more estimated indications of the complexity of the one or more image sections to estimate, for each of a plurality of candidate quantization levels, an indication of the number of bits that would be generated by encoding the one or more image sections in the image using the respective candidate quantization level; and
   select one of the plurality of candidate quantization levels based on a target number of bits and based on the estimated indications of the number of bits that would be generated by encoding the one or more image sections in the image using the respective candidate quantization levels, wherein the encoder processing block is configured to use said selected quantization level in encoding the image.

7. The image processor of claim 1 wherein the image pre-processing block is configured to determine the metadata by:
   using the one or more estimated indications of the complexity of the one or more image sections to estimate, for each of a plurality of candidate quantization levels, an indication of the number of bits that would be generated by encoding the one or more image sections in the image using the respective candidate quantization level; and
   selecting one of the plurality of candidate quantization levels based on a target number of bits and based on the estimated indications of the number of bits that would be generated by encoding the one or more image sections in the image using the respective candidate quantization levels, wherein the metadata comprises the selected quantization level.

8. The image processor of claim 7 wherein the encoder processing block comprises a rate controller and an encoder module, wherein it is the rate controller that is configured to receive the metadata determined by the image pre-processing block and to use the received metadata to determine a quantization level for use in encoding the image, and wherein it is the encoder module that is configured to encode the image using the determined quantization level, and wherein the rate controller determines the quantization level by receiving the selected quantization level in the metadata and passing an indication of the selected quantization level to the encoder module.

9. The image processor of claim 6 wherein said selected quantization level is the one of the plurality of candidate quantization levels for which the estimated indication of the number of bits that would be generated by encoding the one or more image sections in the image using that candidate quantization levels is closest to the target number of bits.

10. The image processor of claim 6 wherein the plurality of candidate quantization levels comprises either: (i) all of the quantization levels that the encoder processing block is configured to be able to use to encode the image, or (ii) a subset of all of the quantization levels that the encoder processing block is configured to be able to use to encode the image.

11. The image processor of claim 1 wherein the indication of the complexity of an image section is an entropy of the image section.

12. The image processor of claim 1 wherein the encoder processing block is configured to encode the image according to the High Efficiency Video Coding compression standard.

13. The image processor of claim 1 wherein the received image data relates to at least one of:
(i) an image captured by an image sensor;
(ii) a computer-generated image rendered by a graphics processing unit;
(iii) a screen-shot of a display of a device; and
(iv) an image retrieved from a memory.

14. The image processor of claim 13, wherein the received image data relates to an image captured by an image sensor and wherein the image pre-processing block is configured to receive the image data from the image sensor; or wherein the received image data relates to a computer-generated image rendered by a graphics processing unit and wherein the image pre-processing block is configured to receive the image data from the graphics processing unit.

15. A method of processing an image, comprising:
receiving image data in electronic form, wherein the image data is to be processed to provide an image;
processing the received image data to provide the image, said image having at least one image section having a plurality of pixels;
analysing the pixels in the image section to estimate an indication of the complexity of the image section;
determining metadata based on the estimated indication of the complexity of the one or more image sections;
using the metadata to determine a quantization level for use in encoding the image; and
encoding the image using the determined quantization level.

16. The method of claim 15 further comprising:
sending the image from the image pre-processing block to a memory for storage therein; and
receiving the image at the encoder processing block from the memory.

17. The method of claim 16 wherein the memory is external to the image processor.

18. The method of claim 15 further comprising sending the image from the image pre-processing block to the encoder processing block.

19. The method of claim 15 further comprising:
for each of a plurality of candidate quantization levels, using the one or more estimated indications of the complexity of the one or more image sections to estimate an indication of the number of bits that would be generated by encoding the one or more image sections in the image using the respective candidate quantization level; and
selecting one of the plurality of candidate quantization levels based on a target number of bits and based on the estimated indications of the number of bits that would be generated by encoding the one or more image sections in the image using the respective candidate quantization levels, wherein said selected quantization level is for use by the encoder processing block in encoding the image.

20. The method of claim 15 wherein the received image data relates to at least one of:
(i) an image captured by an image sensor;
(ii) a computer-generated image rendered by a graphics processing unit;
(iii) a screen-shot of a display of a device; and
(iv) an image retrieved from a memory.

* * * * *